N. Brand.

Making Hoes.

No. 1,488. Reissued May 26, 1863.

Witnesses:
W. D. Rose
Chas. Hadaway

Inventor:
Nathan Brand
By his Attorney
J. Dennis Jr.

THE GRAPHIC CO. PHOTO-LITH. 39 & 41 PARK PLACE, N.Y.

UNITED STATES PATENT OFFICE.

NATHAN BRAND, OF LEONARDSVILLE, NEW YORK.

IMPROVEMENT IN THE MANUFACTURE OF HOE-BLANKS.

Specification forming part of Letters Patent No. 31,525, dated February 26, 1861; Reissue No. 1,482, dated May 26, 1863.

DIVISION B.

*To all whom it may concern:*

Be it known that I, NATHAN BRAND, of Leonardsville, Madison county, and State of New York, have invented a certain new and useful Improvement in the Process of Making Hoes; and I do hereby declare that the same is described in the following specification and accompanying drawings, which represent the best machinery known to me for performing said process.

Prior to my invention what are termed "gooseneck hoes," with solid shanks formed of the same piece of metal with the hoe-plate, were made by plating the blanks with a hammer or partly by hammering and partly by rolling, requiring the blank from which the hoe is made to be repeatedly reheated, occupying much time and labor and a great consumption of coal and metal. To remedy these disadvantages, and to save labor, coal, and metal, I have invented or discovered a process of plating hoe-blanks by rolling the blank in different directions at a right angle to each other; hence the nature of my invention and improvement in the process of making hoes consists in plating the blank by rolling it in different directions at a right angle to each other instead of plating it by hammering, as heretofore practiced.

To enable others skilled in the art to use my improved process, I will proceed to describe it in connection with the best machinery known to me for performing the same, referring to the accompanying drawings, in which the same letters indicate like parts in each of the figures.

Figure 1:
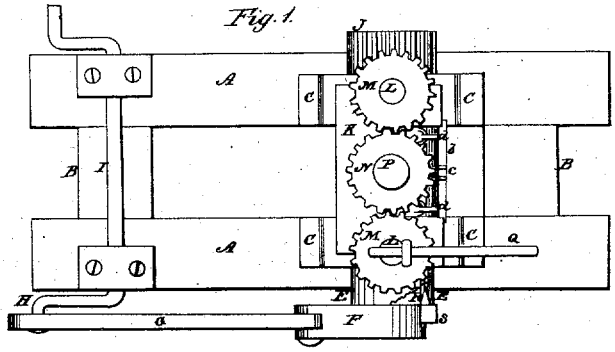
Figures 2, 4, 5:
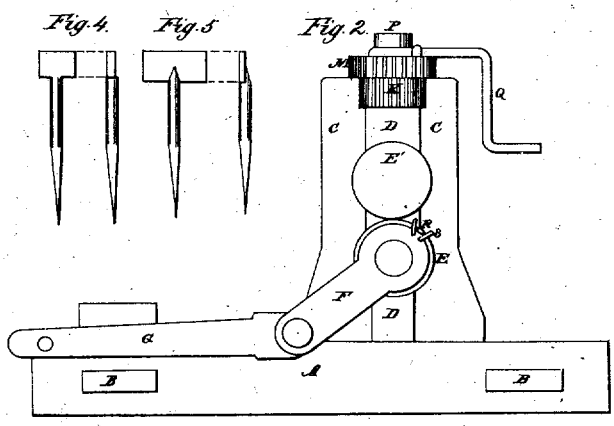

Figure 1 is a plan or top view of a machine with my improvements. Fig. 2 is an elevation of one side of the machine, and Fig. 3 an elevation of one end.

Figures 3, 6:
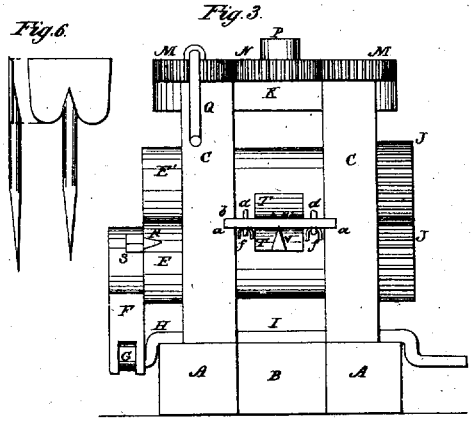

In the above-mentioned drawings, A A are side sills connected by the bars B B, making a strong frame, to which the standards C C are fastened a proper distance apart to receive the boxes D D for the journals of the rollers E E′, which may be made in the form shown in the drawings. The roller E is provided with a crank, F, connected by the link G to the crank H on the shaft I, which turns in boxes fastened to the sills A A, and may be provided with a pulley or gear to turn it and vibrate the rollers E E with a reciprocatory motion, said rollers being connected at the end opposite the crank by the gears J J to move their surfaces in unison when they are operated. The crank F should be one-fourth longer than the crank H, or so proportioned that one revolution of H will turn the rollers one-third the way around and back again. The four standards C C are connected at the top by the bar K, which is firmly fastened to them. To force the roller E′ down on the hoe-blank after it is put between the rollers, I make female screws in the bar K right over the boxes D D and fit the male screw L L to turn in the bar, to which screws the gears M M are fastened and connected to each other by the stud-gear N, which turns on the stud P in the bar K, as shown in Figs. 1 and 3. The crank or lever Q is fastened to the gear M to enable the workman to turn the screws L L with one hand and close the rollers or dies on the hoe-blank while he holds it between said rollers or dies with the other hand. The rollers or dies which are first applied to the hoe-blank project beyond the standards C at the left hand in Fig. 3, and the roller E has a longitudinal groove or score, R, in it parallel with the axis of the roller, in which score the extension of the shank onto the hoe-plate is formed as the blank is elongated by these rollers at a right angle to its shank. Opposite to the score R there are two prongs fastened in the end of the crank F, forming the forked guide S. Into this the shank of the hoe-blank is placed when the blank is put between the rollers. The faced dies T T are arranged upon the rollers centrally between the standards to roll the hoe-blank and elongate it parallel with the shank, and the lower roller, T, has a groove or score, V, in it running a short distance upon it to form the extension of the shank onto the plate of the hoe. This score V runs circumferentially on the die or roller at a right angle to its axis, as shown in Fig. 3. There are some grooves *a a* in the standards C for the ends of the bar *b* to traverse in, which bar *b* has two rods or links, *d d*, fastened to it to connect it to the eyes in the roller E, so that as the roller is rocked or vibrated the bar *b* is traversed to correspond very nearly with the surface of the roller and carries the notched guide

*c* with it, into which guide the shank of the hoe-blank is placed when it (the blank) is to be acted on by the rollers to elongate it parallel with the shank and spread the blank to make it as thin and as large as it may be required.

The hoe-blank, Fig. 4, is prepared in a manner well known and practiced by hoe-makers, and properly heated and placed between the ends of the rollers with the shank in the forked guide S with one hand, and held there and rolled while the other hand seizes the crank Q and turns the screw L and closes the rollers on the blank, and when it has been sufficiently elongated at a right angle to its shank, as shown in Fig. 5, and while it is still hot the screw is turned back and the blank taken out and placed between the dies T T with the shank in the notched guide *c* and held there while the screws L L are turned and the blank elongated parallel with the shank and rolled to make it as large and as thin as required, when it may be taken to the shears and cut the size required.

From the above description it is apparent that the blank is rolled first at a right angle to the shank and then parallel with it until it is as thin and as large as shown at Fig. 6. The dies may be filed off about or around the scores R and V to make the plate of the hoe gradually thicker and stiffer as it approaches the shank.

The advantage of making hoes by rolling instead of hammering may be enumerated as follows, to wit: Two men with one machine and two fires can plate as many hoes in a day as twelve men, six trip-hammers, and six fires; and one machine to roll hoes only requires as as much power to operate it as one trip-hammer; hence the labor of ten men, the coal for four fires, and the power required for five trip-hammers is saved, and the hoes plated by rolling are finished with one-third of the labor required to finish those plated by hammering; and, besides, the rolled hoes are better than the hammered, as the metal is packed and plated more uniformly; and, further, the rolled hoes are made with two ounces less of metal than the hammered hoes, and steel that will not answer to make hoes by hammering will make good hoes if plated by rolling.

I believe I have described my improved process of making hoes and the machinery by which such process may be easily and readily performed so as to enable any person skilled in the art to make and use it and perform the process without further invention or experiment.

I will now state what I desire to secure by Letters Patent, to wit:

In the production or manufacture of hoe-blanks with shanks made of the same piece of metal with the plate and extending onto the plate as a rib and strengthened around and at the point of the rib by making the metal thicker than in the more extended portions of the hoe-blank, forming said hoe-blanks by rolling them in different directions at a right angle to each other, as set forth.

Witnesses: NATHAN BRAND.
LUKE HOXIE,
ISAAC PARK.